(12) United States Patent
Katayama

(10) Patent No.: US 7,827,221 B2
(45) Date of Patent: Nov. 2, 2010

(54) FRACTION DISPLAY APPARATUS

(75) Inventor: Yoshinaga Katayama, Kawasaki (JP)

(73) Assignee: Casio Computer Co., Ltd., Tokyo (JP)

( * ) Notice: Subject to any disclaimer, the term of this patent is extended or adjusted under 35 U.S.C. 154(b) by 988 days.

(21) Appl. No.: 11/640,750

(22) Filed: Dec. 18, 2006

(65) Prior Publication Data
US 2007/0150863 A1    Jun. 28, 2007

(30) Foreign Application Priority Data
Dec. 22, 2005    (JP) ............................. 2005-370609

(51) Int. Cl.
*G06F 3/02*    (2006.01)
(52) U.S. Cl. .................................... 708/137
(58) Field of Classification Search ........................ None
See application file for complete search history.

(56) References Cited

U.S. PATENT DOCUMENTS 4,064,398 A * 12/1977 Kishimoto et al. .......... 708/137
5,138,566 A * 8/1992 Comforti ................... 708/137
5,309,380 A    5/1994 Satoh et al.

2007/0150863 A1 * 6/2007 Katayama ................... 717/110

FOREIGN PATENT DOCUMENTS

JP    4-252351 A    9/1992

OTHER PUBLICATIONS

An English translation of a Chinese Office Action dated Apr. 11, 2008, issued in a counterpart Chinese Application.

* cited by examiner

*Primary Examiner*—David H Malzahn
(74) *Attorney, Agent, or Firm*—Holtz, Holtz, Goodman & Chick, PC

(57) ABSTRACT

A mathematical calculator where when a mixed fraction key is depressed, an integer part input area, a numerator input area, a denominator input area and a vinculum for a mixed fraction are displayed on a display screen. When a user depresses a "1" key of a numeric keypad, "1" is inputted and displayed to and on the integer part input area. When the user depresses a "+" operator key, a CPU prohibits the inputted "+" operator from being inputted and displayed to and on the integer part display area. When the user depresses the "+" operator key in a state in which "(1" is inputted and displayed to and on the integer part input area, the CPU allows the inputted "+" operator from being inputted and displayed to and on the integer part display area.

7 Claims, 11 Drawing Sheets

(a) Improper fraction key is depressed.

(b) "1" key is depressed.

(c) " ↓ " key is depressed.

(d) "2" key is depressed.

(e) EXE key is depressed.

(a) Improper fraction key is depressed.

(b) "1" key is depressed.

(c) "↓" key is depressed.

(d) "2" key is depressed.

(e) "←" key is depressed twice.

(f) "3" key is depressed.

(g) EXE key is depressed.

(a) Mixed fraction key is depressed.

(b) "1" key is depressed.

(c) "+" key is depressed.

(d) "X" key is depressed.

(a) Mixed fraction key is depressed.

(b) "+" key is depressed.

(c) "X" key is depressed.

(a) Mixed fraction key is depressed.

(b) "(" key is depressed.

(c) "1" key is depressed.

(d) "+" key is depressed.

(e) "2" key is depressed.

(f) ")" key is depressed.

(g) "→" key is depressed.

(h) "2" key is depressed.

(i) "↓" key is depressed.

(j) "3" key is depressed.

(k) "←" key is depressed six times.

(l) DEL key is depressed.

(m) EXE key is depressed.

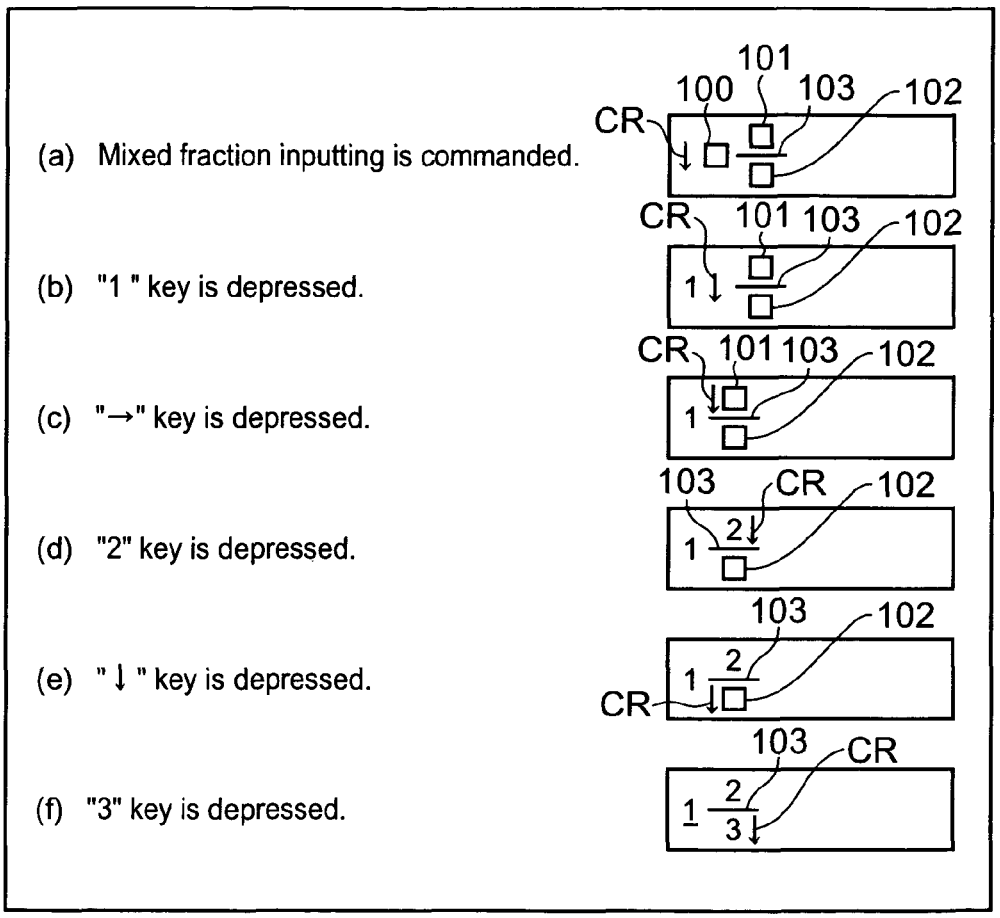

FRACTION DISPLAY APPARATUS

BACKGROUND OF THE INVENTION

1. Field of the Invention

The present invention relates to fraction display apparatus and program.

2. Background Art

There have been electronic calculators called a mathematical calculator that calculates the value of a respective one of various numerical expressions including different arithmetic expressions and sinusoidal and logarithmic functions inputted thereto and displays the calculated value of the respective numerical expression.

These mathematical calculators employ a single-line display form and a natural display form which is used in general books or school-books, in each of which forms an inputted numerical expression is expressed. If, for example, the square of "a" is expressed, it is expressed "a^2" in the single-line expression form and "$a^2$" in the natural expression form. The natural expression form includes an improper fraction form and a mixed fraction form each of which expresses a fraction as an operand larger than 1 (unity).

As shown in FIG. 13(a), when the conventional mathematical calculator is caused to display a mixed fraction on a display screen thereof, first, the calculator is given a command to input a mixed fraction thereto, thereby displaying on the display screen an integer display area 100 into which the integer of the fraction should be inputted, a numerator display area 101 into which the numerator of the fraction should be inputted, a denominator display area 102 into which the denominator of the fraction should be inputted, and a vinculum 103 between the numerator and the denominator. Then, as shown in FIG. 13(b)-(f), by operating numeral keys and direction keys, corresponding numerals (for example, "1", "2" and "3") are displayed in the integer display area 100, the numerator display area 101 and the denominator display area 102, respectively, thereby completing the mixed fraction.

A numerical expression such as "1+2" can be desired to be inputted to an integer part of a mixed fraction in the mathematical calculator capable of expressing the mixed fraction in order to make the calculating process visually plain. As shown in FIG. 14, however, if the integer part of the fraction includes a numerical expression $$"1 + 2\frac{2}{3}",$$

it would be confusing whether the integer part of the mixed fraction is the whole of "1+2" or only "2" simply by viewing the display screen into which the numerals are inputted. That is, what the integer part of the mixed fraction really points to is difficult to discriminate.

SUMMARY OF THE INVENTION

It is therefore an object of the present invention to provide a fraction display apparatus and program capable of recognizing an integer part of a mixed fraction easily.

In order to achieve the above object, the present invention provides a fraction display apparatus comprising: a display unit with a display screen; a mixed fraction display setting unit that sets on the display screen an integer part display area, a numerator display area, a vinculum, and a denominator display area for a mixed fraction; a numerical expression component input unit by which numerical expression components including at least a numeral, an operator and a bracket are inputted manually to the apparatus; a display position control unit that inputs the numerical expression components inputted by the numerical expression component input unit to the corresponding integer part display area, numerator display area and denominator display area for displaying purposes; an operator input prohibiting unit that prohibits the display position control unit from inputting the operator inputted by the numerical expression component input unit to the integer part display area when nothing or only numerical values are in the integer part display area; and an operator input allowing unit that when an open bracket and a numeral are inputted in this order in the integer part display area, starting with its head, allows the display position control unit to input the operator at a position after the numerical value in the integer part display area.

The mixed fraction display setting unit is preferably responsive to a manual mixed fraction setting operation to set the integer part display area, numerator display area, vinculum and denominator display area on the display screen. In this case, a numerical expression other than the mixed fraction may be displayed on the display screen.

The numerator and denominator of the mixed fraction each are not required to be an integer, but may be a fraction or a decimal fraction. The numeral of the numerator may be larger than that of the denominator. The numerical expression components are, for example, numerals, operators, brackets, etc.

According to the present invention, when nothing or only numerals are inputted into the integer part display area, the integer part display controller prohibits the display position controller from inputting the operator received through the numerical expression component input unit to the integer part display area, thereby preventing a numerical expression from being displayed on the integer part of a mixed fraction. Thus, unlike the case in which an operator is displayed in the integer part, a portion of the integer part is prevented from being identified by the user as a different numerical expression component from a mixed fraction. Thus, the integer part of the mixed fraction is easy to identify.

In a state where an open bracket and a numeral are displayed in this order in the integer part display area, an operator is allowed to be inputted at a position after the numeral in the integer display area. Thus, when the integer part of the mixed fraction is easily identified because of the presence of the open bracket, a numerical expression including a numeral and an operator is allowed to be inputted in the integer part thereof.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 13 shows transitional views of a fraction display picture indicating operation of a conventional calculator; and FIG. 14 shows a prior art display screen where a numerical expression is input.

DETAILED DESCRIPTION OF THE INVENTION

A mathematical calculator involving a fraction display apparatus according to the present invention will be described with reference to the drawings.

1. Composition 1.1 External Composition

Figure 1:
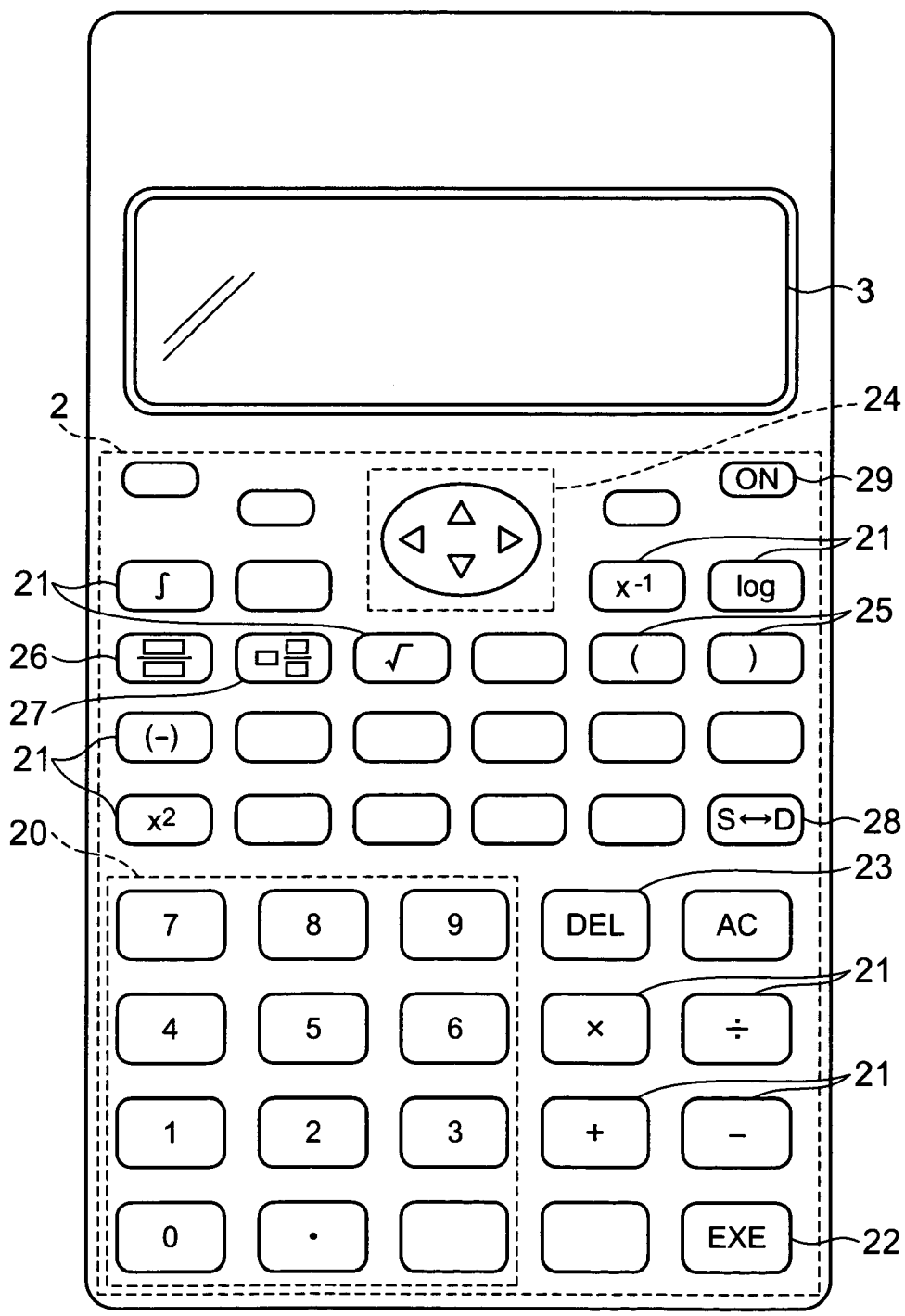
FIG. 1 is a front view of a mathematical calculator as one embodiment of the present invention.

FIG. 1 is a front view of the mathematical calculator 1, which includes a key group 2 and a display screen 3. The key group 2 comprises a plurality of keys having unique functions allocated thereto, by which a user is able to input numerals and operators as numerical expression components to the calculator, and give commands to execute various processing steps. More specifically, the key group 2 is divided into a numeric keypad 20, an operator keypad 21, an EXE key 22, a DEL key 23, a direction keypad 24, a bracket keypad 25, an improper fraction key 26, a mixed fraction key 27, a fraction-decimal conversion key 28 and a power source key 29.

The numeric keypad 20 is used to input various numerals into the calculator. The operator keypad 21 is used to input various operators to the calculator to perform arithmetic, integrating, logarithmic and exponential operations. The EXE key 22 is used to give a processing command to execute an operation after a numerical expression is inputted to the calculator. When in this embodiment an improper fraction larger than 1 (unity) is inputted as a numerical expression, it will be converted to a proper fraction in an operating process.

The DEL key 23 is used to delete numerical expression components such as numerical values, operators and brackets displayed on the display screen 3. The direction keypad 24 is used to move a cursor CR (see FIGS. 6-12) or to select a function. In this embodiment, the direction keypad 24 is composed of up, down, right and left direction keys. The bracket keypad 25 is used to input open/closed brackets into the calculator.

The improper fraction key 26 is used to give a command to select and input an improper fraction or a proper fraction. The mixed fraction key 27 is used to give a command to select and input a mixed fraction. The fraction-decimal conversion key 28 is used to convert a fraction displayed as a result of an arithmetic operation to a decimal fraction and vise versa. The power source key 29 is used to turn on/off the power source of the calculator 1.

The display screen 3 displays characters, symbols, numerical expressions, results of mathematical operations, and various data necessary to use the calculator 1. As shown in FIGS. 6-12, when the improper fraction key 26 is depressed, a numerator display area 90, a denominator display area 91 and a vinculum 93 between those areas where the corresponding numerals of an improper fraction or a proper fraction are inputted are set on the display screen 3. When the mixed fraction key 27 is depressed, an integer part display area 92, a numerator display area 90, a denominator display area 91 and a vinculum 93 between those areas where the corresponding numerals of a mixed fraction are inputted are set. The numerator display area 90, the denominator display area 91 and the integer part display area 92 are each displayed in a rectangular frame in this embodiment. While the display screen 3 in the present embodiment is illustrated as composed of a dot matrix liquid crystal one, but it may be a TFT (Thin Film Transistor) liquid crystal display or a PDP (Plasma Display Panel) or another display.

1.2 Functional Composition

Figure 2:
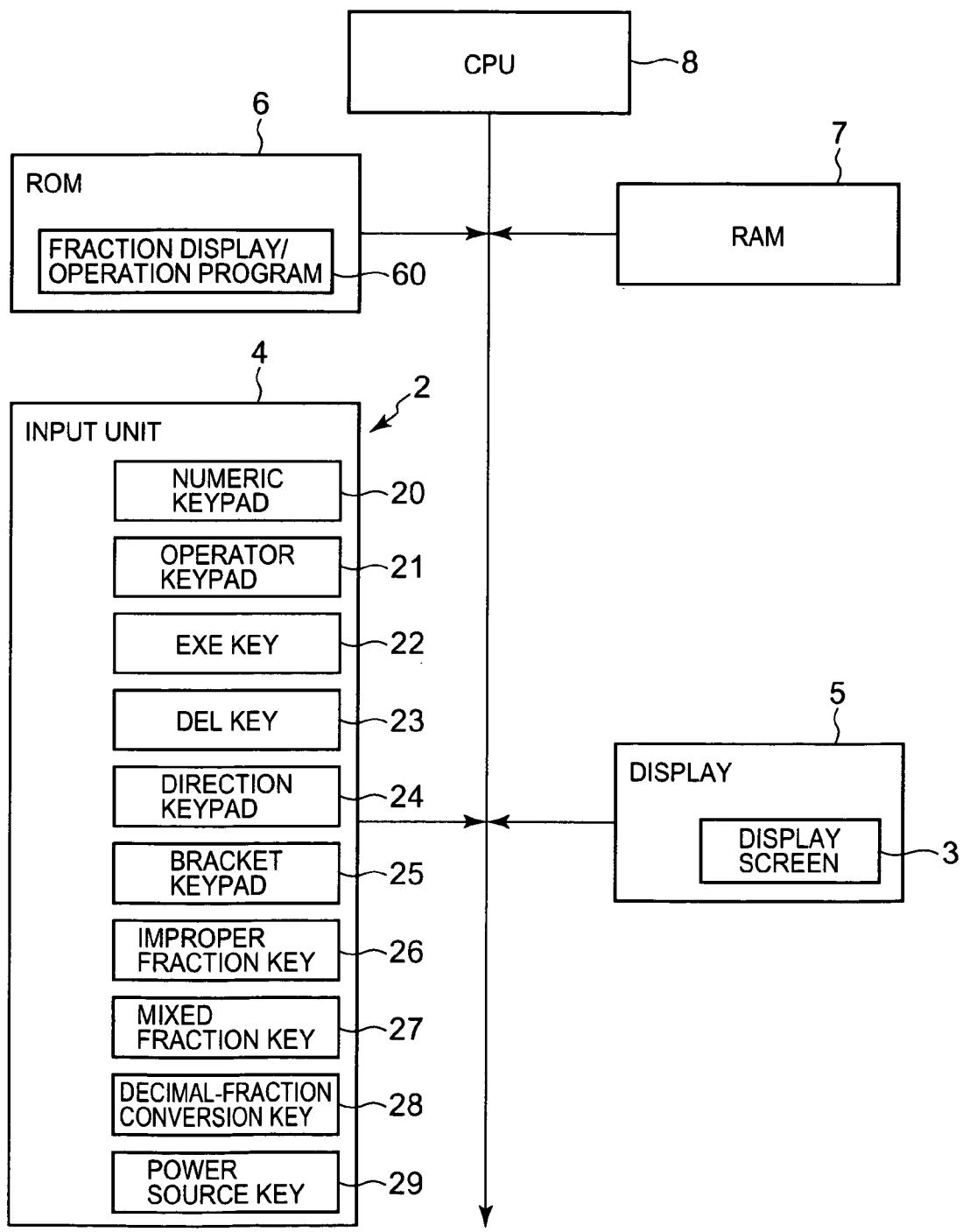
FIG. 2 is a block diagram of a schematic composition of the mathematical calculator.

Next, the functional composition of the calculator 1 will be described. FIG. 2 is a block diagram of the functional composition of the calculator 1. As shown, the calculator 1 comprises an input unit 4, a display unit 5, a ROM (Read Only Memory) 6, a RAM (Random Access Memory) 7 and a CPU (Central Processing Unit) 8, which are connected by a bus 10.

(1.2.1 Input Unit and Display)

When a key of the input unit 4 is depressed, the input unit 4 delivers a corresponding signal to the CPU 8. The display 5 comprises the display screen 3 that displays various information based on signals from the CPU 8.

(1.2.2 Storage)

The ROM 6 has stored various programs for displaying menus, performing various settings and various mathematical operations as well as programs to realize the various functions of the calculator 1 especially including a fraction display/operation program 60 which is read by the CPU 8 and loaded on the RAM 7 for executing purposes.

The RAM 7 temporarily stores various programs to be executed by the CPU 8 and data involving execution of the programs in this embodiment. The RAM 7 stores, for example, numerical expressions inputted by a user and results of mathematical operations performed in accordance with the numerical expressions.

(1.2.3 CPU)

The CPU 8 performs processing based on a predetermined program in accordance with commands given thereto, and gives commands to the respective functional sections of the calculator concerned and transfers required data to requesting functional sections. More specifically, the CPU 8 reads a program stored in the ROM 6 in accordance with an operation signal received from the input unit 4 and performs required processing in accordance with the program. The CPU 8 forwards to the display 5 a display control signal to display a result of the processing as required and displays corresponding information on the display screen 3.

2. Examples of Operation

Subsequently, referring to FIGS. 3-5 and FIGS. 6-12, operation of the calculator 1 in which the CPU 8 executes the fraction display/operation program 60 will be described.

Each picture displayed on the display screen 3 and a corresponding user's operation are shown in the right and left parts of a respective one of FIGS. 6-12.

2.1 First Example of Operation

Figure 3:
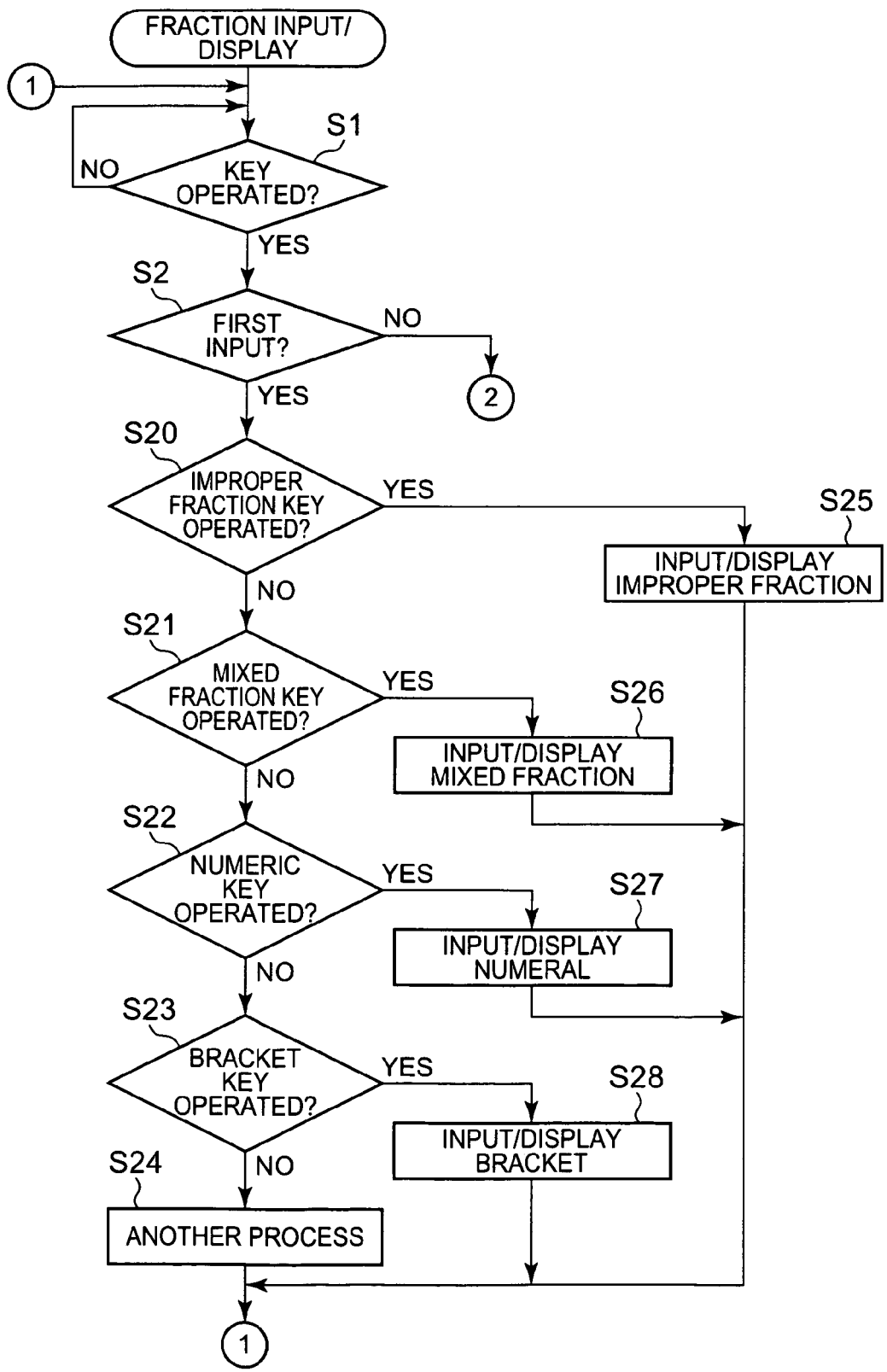
FIG. 3 is a flowchart of a fraction inputting/calculating process to be performed by the mathematical calculator.

First, operation of the calculator 1 where a proper fraction is inputted will be described. As shown in FIGS. 3 and 6(a), the CPU 8 waits until the user operates a key (step S1). When the user depresses the improper fraction key 26 (Yes in step S1), the CPU 8 sequentially determines that the depressed key is for inputting a first numerical expression component (Yes in step S2), and that this key is the improper fraction key 26 (Yes in step S20). Then, the CPU 8 sets and displays the numerator display area 90, vinculum 93 and the numerator display area 91 for a improper fraction or a proper fraction (step S25), and goes to step S1.

Figure 4:
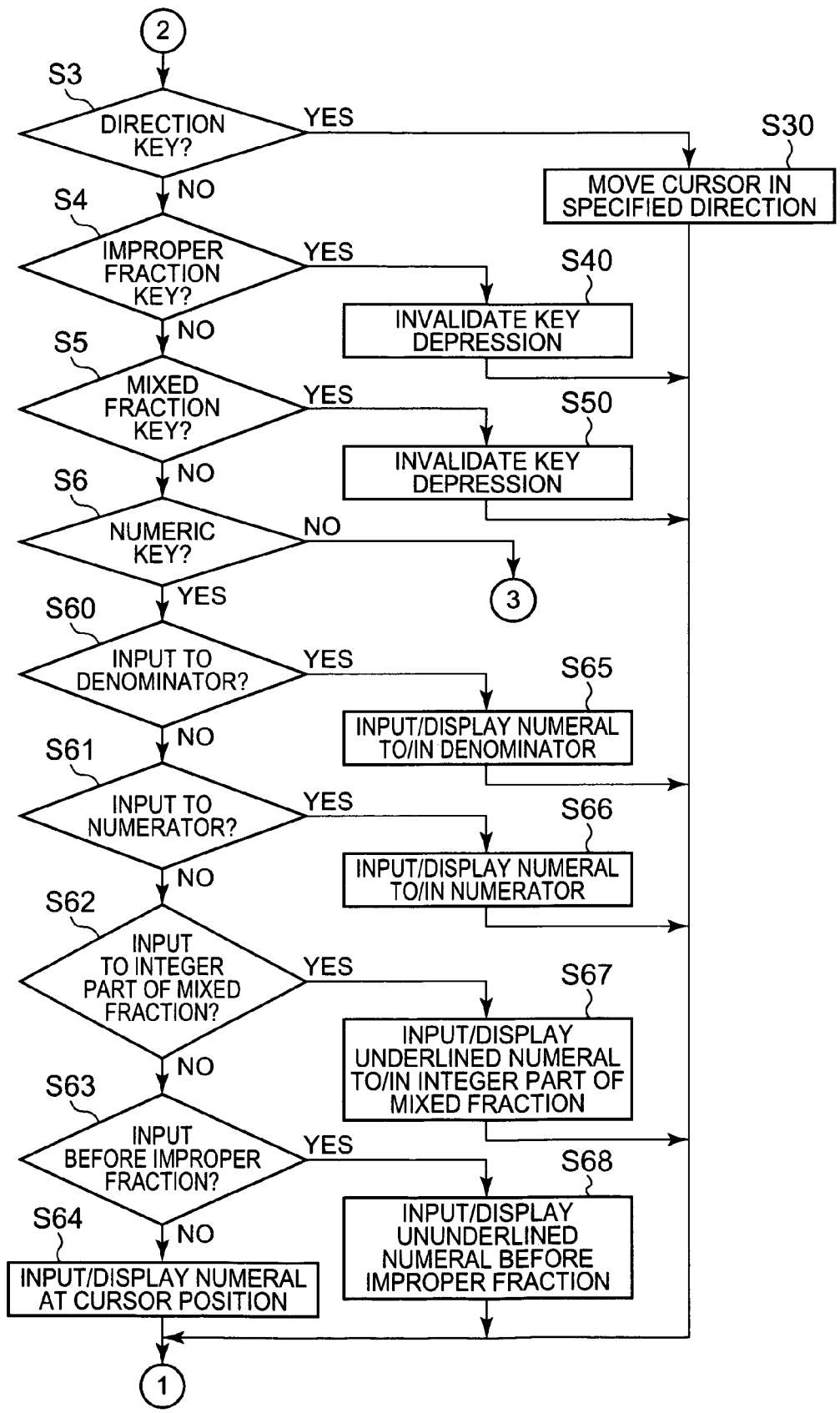
FIG. 4 is a flowchart continued to that of FIG. 3.

Then, as shown in FIGS. 3, 4 and 6(b), when the user depresses an (in this example, "1") key of the numeric keypad 20 (Yes in step S1), the CPU 8 sequentially determines that the depressed key is not for inputting a first numerical expression components (No in step S2), and that this key is not a respective one of that of the direction keypad 24, the improper fraction key 26 and the mixed fraction key 27 (No in a respective one of steps S3-S5), but that of the numeric keypad 20 (Yes in step S6). Then, the CPU 8 determines based on the position of the cursor CR that the depressed numeric key is for inputting a corresponding numeral not to the denominator (No in step S60), but to the numerator (Yes in step S61), inputs "1" to the numerator display area 90 (step S66), and goes to step S1.

Then, as shown in FIGS. 3, 4 and 6(c), when the user depresses an (in this example, "↓") key of the direction keypad 24 (Yes in step S1), the CPU 8 sequentially determines that the depressed key is not for inputting a first numerical expression component (No in step S2), and that this key is that of the direction keypad 24 (Yes in step S3). Then, the CPU 8 moves the displayed cursor CR in a specified (in this example, "downward") direction (step S30) and goes to step S1.

Then, as shown in FIGS. 3, 4 and 6(d), when the user depresses an (in this example, "2" key) of the numeric keypad 20 (Yes in step S1), the CPU 8 sequentially determines that the depressed key is not for inputting a first numerical expression component (No in step S2), and that this key is not a respective one of that of the direction keypad 24, the improper fraction key 26 and the mixed fraction key 27 (No in a respective one of steps S3-S5), but that of the numeric keypad 20 (Yes in step S6). Then, the CPU 8 determines based on the position of the cursor CR that the depressed numeric key is for inputting a corresponding numeral to the denominator (Yes in step S60). Then, the CPU 8 inputs "2" to the denominator display area 91 (step S65) and goes to step S1.

Then, as shown in FIGS. 3, 4 and 6(e), when the user depresses an EXE key (Yes in step S1), the CPU 8 sequentially determines that the depressed key is not for inputting a first numerical expression component (No in step S2), and that this key is not a respective one of that of the direction keypad 24, the improper fraction key 26, the mixed fraction key 27, that of the numeric keypad 20, that of the operator keypad 21, that of the bracket keypad 25, and the DEL key 23 (No in a respective one of steps S3-S9), but the EXE key 22 (Yes in step S10). Then, the CPU 8 determines that the displayed numerical expression has no syntax errors (No in step S11), performs required mathematical operation, displays a result of the operation on the display 3 (Yes in step S12), and then goes to step S1.

2.2 Second Example of Operation

Operation of the calculator 1 where a mixed fraction is inputted to the calculator 1 will be described as a second example. As shown in FIGS. 3 and 7(a), when the user depresses the mixed fraction key 27 (Yes in step S1), the CPU 8 sequentially determines that the depressed key is for inputting a first numerical expression component (Yes in step S2), and that this key is not the improper fraction key 26 (No in step S20), but the mixed fraction key 27 (Yes in step S21). Then, the CPU 8 sets and displays on the display 3 the integer part display area 92, the numerator display area 90, the vinculum 93 and the denominator display area 91 for the mixed fraction (step S26) and then goes to step S1.

Then, as shown in FIGS. 3, 4 and 7(b), when the user depresses an (in this example, "1") key of the numeric keypad 20 (Yes in step S1), the CPU 8 sequentially determines that the depressed key is not for inputting a first numerical expression component (No in step S2), and that this key is not a respective one of that of the direction keypad 24, the improper fraction key 26 and the mixed fraction key 27 (No in a respective one of steps S3-S5), but that of the numeric keypad 20 (Yes in step S6). Then, the CPU 8 determines based on the position of the cursor CR that the depressed numeric key is for inputting a corresponding numeral not to a respective one of the numerator and denominator display areas for the mixed fraction (No in steps S60 and S61), but to the integer part display area 92 (Yes in step S62). Then, the CPU 8 inputs and displays an underlined "1" to and on the integer part display area 92 of the display (step S67), and goes to step S1.

Then, as shown in FIGS. 3, 4 and 7(c), when the user depresses an (in this example, "→") key of the direction keypad 24 (Yes in step S1), the CPU 8 sequentially determines that the depressed key is not for inputting a first numerical expression component (No in step S2), and that this key is that of the direction keypad 24 (Yes in step S3). Then, the CPU 8 moves the displayed cursor CR in a specified (in this example, "rightward") direction (step S30) and goes to step S1.

Then, as shown in FIGS. 3, 4 and 7(d), when the user depresses an (in this example, "2") key of the numeric keypad 20 (Yes in step S1), the CPU 8 sequentially determines that the depressed key is not for inputting a first numerical expression component (No in step S2), and that this key is not a respective one of that of the direction keypad 24, the improper fraction key 26 and the mixed fraction key 27 (No in a respective one of steps S3-S5), but that of the numeric keypad 20 (Yes in step S6). Then, the CPU 8 determines based on the position of the cursor CR that the depressed numeric key is for inputting a corresponding numeral not to the denominator of the mixed fraction (No in step S60), but to its numerator (Yes in step S61). Then, the CPU 8 inputs and displays "2" to and on the numerator display area 90 (step S66), and goes to step S1.

Then, as shown in FIGS. 3, 4 and 7(e), when the user depresses an (in this example, "↓") key of the direction keypad 24 (Yes in step S1), the CPU 8 sequentially determines that the depressed key is not for inputting a first numerical expression component (No in step S2), and that this key is that of the direction keypad 24 (Yes in step S3). Then, the CPU 8 moves the displayed cursor CR in a specified (in this example, "downward") direction (step S30) and goes to step S1.

Then, as shown in FIGS. 3, 4 and 7(f), when the user depresses an (in this example, "3") key of the numeric keypad 20 (Yes in step S1), the CPU 8 sequentially determines that the depressed key is not for inputting a first numerical expression component (No in step S2), and that this key is not a respective one of that of the direction keypad 24, the improper fraction key 26 and the mixed fraction key 27 (No in a respective one of steps S3-S5), but that of the numeric keypad 20 (Yes in step S6). Then, the CPU 8 determines based on the position of the cursor CR that the depressed numeric key is for inputting a corresponding numeral to the denominator (Yes in step S60). Then, the CPU 8 inputs and displays "3" to the denominator display area 91 (step S65) and goes to step S1.

Then, as shown in FIGS. 3-5 and 7(g), when the user depresses the EXE key (Yes in step S1), the CPU 8 sequentially determines that the depressed key is not for inputting a first numerical expression component (No in step S2), and that this key is not a respective one of that of the direction keypad 24, the improper fraction key 26, the mixed fraction key 27, that of the numeric keypad 20, that of the operator keypad 21, that of the bracket keypad 25, and the DEL key 23 (No in a respective one of steps S3-S9), but the EXE key 22 (Yes in step S10). Then, the CPU 8 determines that the displayed numerical expression has no syntax errors (No in step S11). Then, the CPU 8 performs required operation, displays a result of the operation on the display 3 (Yes in step S12), and goes to step S1.

2.3 Third Example of Operation

Operation of the calculator 1 where a proper or improper fraction is inputted directly after an integer displayed in the display area will be described as a third example. First, as shown in FIGS. 3 and 8(a), when the user depresses an (in this example, "1") key of the numeric keypad 20 (Yes in step S1), the CPU 8 sequentially determines that the depressed key is for inputting a first numerical expression component (Yes in step S2), and that this key is not a respective one of the improper fraction key 26 and the mixed fraction key 27 (No in a respective one of steps S20 and S21), but that of the numeric keypad 20 (Yes in step S22). Then, the CPU 8 inputs and displays "1" to and on the display 3 (step S27) and goes to step S1.

Then, when the user depresses an (in this example, "2") key of the numeric keypad 20 (Yes in step S1), the CPU 8 sequentially determines that the depressed key is not for inputting a first numerical expression component (No in step S2), and that this key is not a respective one of that of the direction keypad 24, the improper fraction key 26 and the mixed fraction key 27 (No in a respective one of steps S3-S5), but that of the numeric keypad 20 (Yes in step S6). Then, the CPU 8 determines based on the position of the cursor CR that the depressed numeric key is for inputting a corresponding numeral not to a respective one of the denominator and the numerator of the improper fraction or a mixed fraction, the integer part of the mixed fraction, and a position directly before the mixed fraction or the proper fraction (No in each of steps S60, S61, S62 and S63). Then, the CPU 8 inputs and displays "2" to and at the displayed position of the cursor CR (in this example, directly after "1") (step S64) and goes to step S1.

Then, as shown in FIGS. 3, 4 and 8(b), when the user depresses the improper fraction key 26 (Yes in step S1), the CPU 8 sequentially determines that the depressed key is not for inputting a first numerical expression component (No in step S2), and that this key is not that of the direction keypad 24 (No in step S3), but the improper fraction key 26 (Yes in step S4). Then, the CPU 8 prohibits any of the numerator display area 90, the vinculum 93 and the denominator display area 91 from being set directly after a numeral "12", and more particularly invalidates the improper fraction key 26 operation, based on the determination (step S40). Then, the CPU 8 goes to step S1. That is, display of the fraction directly after the numeral prevents the user from identifying a combination of the numeral and the fraction as the mixed fraction.

Similarly, when the user depresses the mixed fraction key 27 (Yes in step S1), the CPU 8 sequentially determines that the depressed key is not for inputting a first numerical expression component (No in step S2), and that this key is not a respective one of that of the direction keypad 24 and the improper fraction key 26 (No in a respective one of steps S3 and S4), but the mixed fraction key 27 (Yes in step S5). Then, the CPU 8 prohibits the integer part display area 92 from being set directly after the numeral "12" and more particularly, invalidates the operation of the mixed fraction key 27, based on the determination (step S50). Then, the CPU 8 goes to step S1.

As described above, the CPU 8 prohibits the integer part display area 92 and hence the integer part of the mixed fraction from being set and displayed, respectively, directly after the numeral, thereby preventing the position of the head of the integer part from being unclear.

2.4 Fourth Example of Operation

Operation of the calculator 1 where an integer is inputted directly before a proper or improper fraction on the display area will be described as a fourth example. First, like the first example of operation, when the user sequentially depresses the improper fraction key 26, an (in this example, "1" key) of the numeric keypad 20, an (in this example, "↓") key of the direction keypad 24, and another (in this example, "2") key of the numeric keypad 20, the CPU 8 displays "½" on the display 3 and then goes to step S1 (see FIG. 9(a)-(d)).

Then, as shown in FIGS. 3, 4 and 9(e), when the user depresses an (in this example, "←") key of the direction keypad 24 twice (Yes in step S1), the CPU 8 sequentially determines that the depressed key is not for inputting a first numerical expression component (No in step S2), and that this key is that of the direction keypad 24 (Yes in step S3). Then, the CPU 8 moves the displayed cursor CR in the specified (in this example, "leftward") direction (step S30) and goes to step S1. Thus, the cursor CR moves to a position directly before a fraction "½", as shown in FIG. 9E.

Then, as shown in FIGS. 3, 4 and 9(f), when the user depresses an (in this example, "3") key of the numeric keypad 20 (Yes in step S1), the CPU 8 sequentially determines that the depressed key is not for inputting a first numerical expression component (No in step S2), and that this key is not a respective one of that of the direction keypad 24, the improper fraction key 26 and the mixed fraction key 27 (No in a respective one of steps S3-S5), but that of the numeric keypad 20 (Yes in step S6). Then, the CPU 8 determines based on the position of the cursor CR that the depressed numeric key is for inputting a corresponding numeral not to the denominator and numerator of the improper fraction or a mixed fraction and to the integer part of the mixed fraction (No in each of steps S60, S61 and S62), but to a position directly before the proper or improper fraction (Yes in step S63). Then, the CPU 8 displays "3" directly before "½" (step S68), and goes to step S1. Note that since the numeral displayed directly before the displayed fraction does not compose a portion of the integer part of the mixed fraction, the CPU 8 displays an underlined numeral unlike in the second example of operation.

Then, as shown in FIGS. 3-5 and 9(g), when the user depresses the EXE key 22 (Yes in step S1), the CPU 8 sequentially determines that the depressed key is not for inputting a first numerical expression component (No in step S2), and that this key is not a respective one of that of the direction keypad 24, the improper fraction key 26, the mixed fraction key 27, that of the numeric keypad 20, that of the operator keypad 21, that of the bracket keypad 25, and the DEL key 23 (No in a respective one of steps S3-S9), but the EXE key 22 (Yes in step S10). Then, the CPU 8 determines that the displayed numerical expression has no syntax errors (No in step S11), and then performs required operation (more particularly, including performing a multiplication of numerals "3" and "½" and then converting a result of the multiplication to a mixed fraction). Then, the CPU 8 displays on the display 3 a result of the operation, in which the integer part of the mixed fraction is underlined (Yes in step S12), and goes to step S1.

As described above, in a state where a numeral is inputted directly before an improper fraction on the display, the CPU 8 multiplies the numeral by the improper fraction. Thus, the operation is performed in accordance with the inputted numerical expression even when it is unclear whether the displayed number is a mixed fraction or the product of an integer and an improper fraction.

2.5 Fifth Example of Operation

Operation of the calculator 1 where a numerical expression is inputted to the integer part of the mixed fraction display area will be described as a fifth example. Like in the second example of operation, when the user depresses the mixed fraction key 27 and an (in this example, "1") key of the numeric keypad 20, the CPU 8 inputs and displays "1" to and on the integer part display area 92 of the display 3 and then goes to step S1 (see FIGS. 10(*a*) and (*b*)).

Then, as shown in FIGS. 3-5 and 10(*c*), when the user depresses an (in this example, "+") key of the operator keypad 21 (Yes in step S1), the CPU 8 sequentially determines that the depressed key is not for inputting a first numerical expression component (No in step S2), and that this key is not a respective one of that of the direction keypad 24, the improper fraction key 26, the mixed fraction key 27 and that of the numeric keypad 20 (No in a respective one of steps S3-S6), but that of the operator keypad (Yes in step S7). Then, the CPU 8 determines based on the position of the cursor CR that the depressed operation key is for inputting a corresponding operator to the integer part display area 92 of the mixed fraction (Yes in step S70), and that no open bracket "(" is displayed before the integer part display area 92 (No in step S71). Then, the CPU 8 prohibits inputting and displaying the operator to and on the integer part display area 92, and more particularly, invalidates the operation of the key of the operator keypad 21 (step S72) and goes to step S1.

Similarly, as shown in FIGS. 3-5 and 10(*d*), also when the user depresses an (in this example, "x") key of the operator keypad 21 (Yes in step S1), the CPU 8 invalidates the key operation (step S72), and then goes to step S1.

As described above, when only a numeral is inputted to the integer part display area 92, the CPU prohibits an operator from being inputted to the integer part display area 92, thereby preventing a numerical expression from being inputted to the integer part of the of the mixed fraction.

2.6 Sixth Example of Operation

Another operation of the calculator 1 where a numerical expression is inputted to the integer part of a mixed fraction on the display screen will be described as a fifth example. When the user depresses the mixed fraction key 27 (Yes in step S1), the CPU 8 sets and displays on the display 3 the integer part display area 92, the numerator display area 90, the vinculum 93 and the denominator display area 91 for the mixed fraction (step S26) and then goes to step S1 (see FIG. 11(*a*)).

Then, as shown in FIGS. 3-5 and 11(*b*), when the user depresses an (in this example, "+") key of the operator keypad 21 (Yes in step S1), the CPU 8 sequentially determines that the depressed key is not for inputting a first numerical expression component (No in step S2), and that this key is not a respective one of that of the direction keypad 24, the improper fraction key 26, the mixed fraction key 27 and that of the numeric keypad 20 (No in a respective one of steps S3-S6), but that of the operator keypad 21 (Yes in step S7). Then, the CPU 8 determines based on the position of the cursor CR that the depressed operator key is for inputting a corresponding operator to the integer part display area 92 of the mixed fraction (Yes in step S70), and that no open bracket "(" is indicated before the integer part display area 92 (No in step S71). Then, the CPU 8 prohibits inputting and displaying the operator to and on the integer part display area 92, and more particularly, invalidates the operation of the operator key (step S72), and goes to step S1.

Similarly, as shown in FIGS. 3-5 and 11(*c*), also when the user depresses an (in this example, "x") key of the operator keypad 21, the CPU 8 invalidates this key operation (step S72), and then goes to step S1.

As described above, when no numerals are inputted to the integer part display area 92, the CPU prohibits any operator from being inputted to the integer part display area 92, thereby prohibiting a numerical expression from being inputted to the integer part of the mixed fraction.

2.7 Seventh Example of Operation

Operation of the calculator 1 where a numerical expression is inputted to the integer part of a mixed fraction on the display screen will be described as a seventh example. Like as in the second example of operation, when the user depresses the mixed fraction key 27 (Yes in step S1), the CPU 8 sets and displays on the display 3 the integer part display area 92, the numerator display area 90, the vinculum 93 and the denominator display area 91 for the mixed fraction (step S26) and then goes to step S1 (see FIG. 12(*a*)).

Then, as shown in FIGS. 3-5 and 12(*b*), when the user depresses an open bracket "(" key of the bracket keypad 25 (Yes in step S1), the CPU 8 sequentially determines that the depressed key is not for inputting a first numerical expression component (No in step S2), and that this key is not a respective one of that of the direction keypad 24, the improper fraction key 26, the mixed fraction key 27, that of the numeric keypad 20 and the EXE key 22 (No in a respective one of steps S3-S7), but that of the bracket keypad 25 (Yes in step S8). Then, the CPU 8 determines based on the position of the cursor CR that the depressed bracket key is for inputting a corresponding bracket to the integer part display area 92 for the mixed fraction (Yes in step S80), and inputs and displays an underlined "(" to the integer part display area 92 (step S81). The CPU 8 then goes to step S1.

Figure 12:
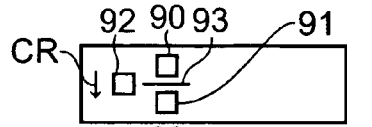
FIG. 12 shows transitional views of a fraction display picture indicating a seventh example of operation of the calculator.
Figure 12:
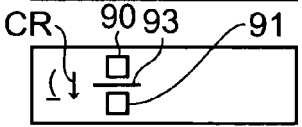
Figure 12:
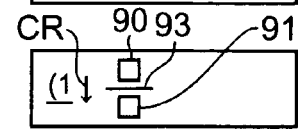
Figure 12:
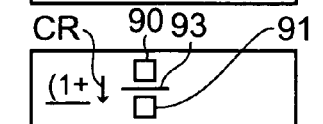
Figure 12:
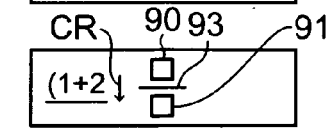
Figure 12:
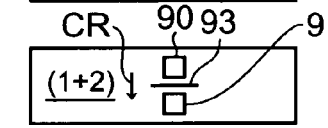
Figure 12:
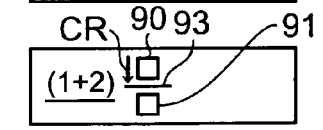
Figure 12:
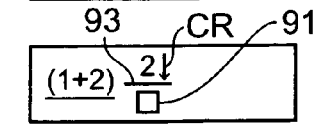
Figure 12:
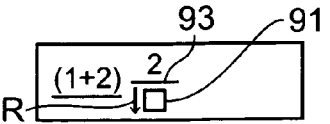
Figure 12:
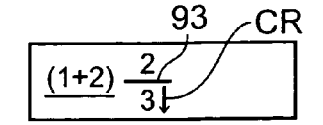
Figure 12:
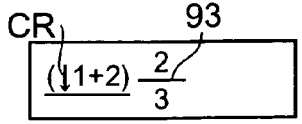
Figure 12:
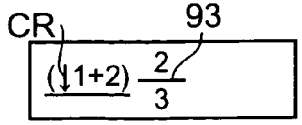
Figure 12:
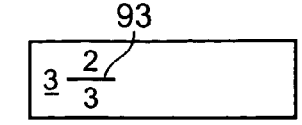

Then, as shown in FIGS. 3, 4 and 12(*c*), when the user depresses an (in this example, "1") key of the numeric keypad 20 (Yes in step S1), the CPU 8 sequentially determines that the depressed key is not for inputting a first numerical expression component (No in step S2), and that this key is not a respective one of that of the direction keypad 24, the improper fraction key 26 and the mixed fraction key 27 (No in a respective one of steps S3-S5), but that of the numeric keypad 20 (Yes in step S6). Then, the CPU 8 determines based on the position of the cursor CR that the depressed numeric key is for inputting a corresponding numeral not to a respective one of the denominator and the numerator (No in a respective one of steps S60 and S61), but to the integer part (Yes in step S62), displays an underlined "1" on the integer part display area 92 (step S67), and goes to step S1.

Then, as shown in FIGS. 3-5 and 12(d), when the user depresses an (in this example, "+") key of the operator keypad 21 (Yes in step S1), the CPU 8 sequentially determines that the depressed key is not for inputting a first numerical expression component (No in step S2), and that this key is not a respective one of that of the direction keypad 24, the improper fraction key 26, the mixed fraction key 27 and that of the numeric keypad 20 (No in a respective one of steps S3-S6), but the operator key (Yes in step S7). Then, the CPU 8 determines based on the position of the cursor CR that the depressed operator key is for inputting a corresponding operand to the integer part display area 92 for the mixed fraction (Yes in step S70), and that there is an open bracket "(" at the head of the integer part display area 92 (Yes in step S71). Then, the CPU 8 allows an operator to be displayed after the open bracket in the integer part display area 92, inputs and displays an underlined "+" symbol at the position of the cursor CR (step S73), and goes to step S1.

As described above, in a state where the open bracket is inputted at the head of the integer part display area 92, the CPU 8 allows an operator to be inputted after the open bracket in the integer part display area 92, thereby clarifying the position of the head of the integer part even when the operator is inputted to the integer part.

Then, as shown in FIGS. 3, 4 and 12(e), when the user depresses an (in this example, "2") key of the numeric keypad 20 (Yes in step S1), the CPU 8 sequentially determines that the depressed key is not for inputting a first numerical expression component (No in step S2), and that this key is not a respective one of that of the direction keypad 24, the improper fraction key 26 and the mixed fraction key 27 (No in a respective one of steps S3-S5), but that of the numeric keypad 20 (Yes in step S6). Then, the CPU 8 determines based on the position of the cursor CR that the depressed numeric key is for inputting a corresponding numeral not to a respective one of the denominator and the numerator (No in each of steps S60 and S61), but to the integer part display area 92 (Yes in step S62). Then, the CPU 8 inputs and displays underlined "2" to and on the integer part display area 92 (step S67), and goes to step S1.

Then, as shown in FIGS. 3-5 and 12(f), when the user depresses a closing bracket ")" key of the bracket keypad 25 (Yes in step S1), the CPU 8 sequentially determines that the depressed key is not for inputting a first numerical expression component (No in step S2), and that this key is not a respective one of that of the direction keypad 24, the improper fraction key 26, the mixed fraction key 27, that of the numeric keypad 20 and the EXE key 22 (No in a respective one of steps S3-S7), but that of the bracket keypad 25 (Yes in step S8). Then, the CPU 8 determines based on the position of the cursor CR that the depressed bracket key is for inputting a corresponding bracket to the integer part display area 92 for the mixed fraction (Yes in step S80), and inputs and displays an underlined ")" to the integer part display area 92 (step S81). The CPU 8 then goes to step S1.

Then, as shown in FIGS. 3, 4 and 12(g), when the user depresses an (in this example, "→") key of the direction keypad 24 (Yes in step S1), the CPU 8 sequentially determines that the depressed key is not for inputting a first numerical expression component (No in step S2), and that this key is that of the direction keypad 24 (Yes in step S3).

Then, the CPU 8 moves the displayed cursor CR in a specified (in this example, "rightward") direction (step S30) and goes to step S1.

Then, as shown in FIGS. 3, 4 and 12(h), when the user depresses an (in this example, "2") key of the numeric keypad 20 (Yes in step S1), the CPU 8 sequentially determines that the depressed key is not for inputting a first numerical expression component (No in step S2), and that this key is not a respective one of that of the direction keypad 24, the improper fraction key 26 and the mixed fraction key 27 (No in a respective one of steps S3-S5), but that of the numeric keypad 20 (Yes in step S6). Then, the CPU 8 determines based on the position of the cursor CR that the depressed numeric key is for inputting a corresponding numeral not to the denominator (No in step S60) but to the numerator (Yes in step S61). Then, the CPU 8 inputs and displays "2" to and on the numerator display area 90 (step S66), and goes to step S1.

Then, as shown in FIGS. 3, 4 and 12(i), when the user depresses an (in this example, "↓") key of the direction keypad 24 (Yes in step S1), the CPU 8 sequentially determines that the depressed key is not for inputting a first numerical expression component (No in step S2), and that this key is that of the direction keypad 24 (Yes in step S3). Then, the CPU 8 moves the displayed cursor CR in a specified (in this example, "downward") direction (step S30), and goes to step S1.

Then, as shown in FIGS. 3, 4 and 12(j), when the user depresses an (in this example, "3") key of the numeric keypad 20 (Yes in step S1), the CPU 8 sequentially determines that the depressed key is not for inputting a first numerical expression component (No in step S2), and that this key is not a respective one of that of the direction keypad 24, the improper fraction key 26 and the mixed fraction key 27 (No in a respective one of steps S3-S5), but that of the numeric keypad 20 (Yes in step S6). Then, the CPU 8 determines based on the position of the cursor CR that the depressed numeric key is for inputting a corresponding numeral to the denominator display area 91 (Yes in step S60), inputs and displays "3" to and on the denominator display area 91 (step S65), and goes to step S1.

Then, as shown in FIGS. 3, 4 and 12(k), when the user depresses an (in this example, "←") key of the direction keypad 24 six times (Yes in step S1), the CPU 8 sequentially determines that the depressed key is not for inputting a first numerical expression component (No in step S2), and that this key is that of the direction keypad 24 (Yes in step S3). Then, the CPU 8 moves the displayed cursor CR in the specified (in this example, "leftward") direction (step S30) and goes to step S1. Thus, the cursor CR moves to a position directly after the open bracket in the integer part display area.

Then, as shown in FIGS. 3-5 and 12(l), when the user depresses the DEL key (Yes in step S1), the CPU 8 sequentially determines that the depressed key is not for inputting a first numerical expression component (No in step S2), and that this key is not a respective one of that of the direction keypad 24, the improper fraction key 26, the mixed fraction key 27, that of the numeric keypad 20, the EXE key 22 and that of the bracket keypad 25 (No in a respective one of steps S3-S8), but the DEL key 23 (Yes in step S9). Then, the CPU 8 determines based on the position of the cursor CR that an object to be deleted by the DEL key 23 is the open bracket in the integer part display area for the mixed fraction (Yes in step S90), and that the integer part includes a numerical expression (Yes in step S91). Then, the CPU 8 prohibits deletion of the open bracket based on a result of the determination, and more particularly, invalidates the operation of the DEL key 23 (step S92), and then goes to step S1.

As described above, in a state where the open bracket and the operator are inputted to the integer part display area 92, the CPU 8 prohibits the open bracket from being deleted, thereby preventing the position of the head of the integer part from being unclear.

Then, as shown in FIGS. 3-5 and 12(*m*), when the user depresses the EXE key 22 (Yes in step S1), the CPU 8 sequentially determines that the depressed key is not for inputting a first numerical expression component (No in step S2), and that this key is not a respective one of that of the direction keypad 24, the improper fraction key 26, the mixed fraction key 27, that of the numeric keypad 20, that of the operator keypad 21, that of the bracket keypad 25, and the DEL key 23 (No in a respective one of steps S3-S9), but the EXE key 22 (Yes in step S10). Then, the CPU 8 determines that the displayed numerical expression has no syntax errors (No in step S11), and performs required operation (more particularly, including performing an adding operation of (1+2) indicative of the integer part. Then, the CPU 8 displays on the display 3 a mixed fraction indicative of a result of the operation in which the integer part is underlined (Yes in step S12), and goes to step S1.

2.8 Other Examples of Operation

Operation of the calculator 1 other than the above-mentioned first-seventh examples of operation will be described next. First, as shown in FIG. 3, when the user depresses a key of the bracket keypad 25 to input a first numerical expression component (Yes in step S23), the CPU 8 displays a corresponding bracket at the position of the cursor CR. When the user depresses a key (for example the power source key) other than the improper fraction key 26, the mixed fraction key 27, that of the numeric keypad 20, and that of the bracket keypad 25 (Yes in steps S1 and S2; No in steps S20-S23), the CPU 8 performs processing corresponding to the depressed key (step S24).

Figure 5:
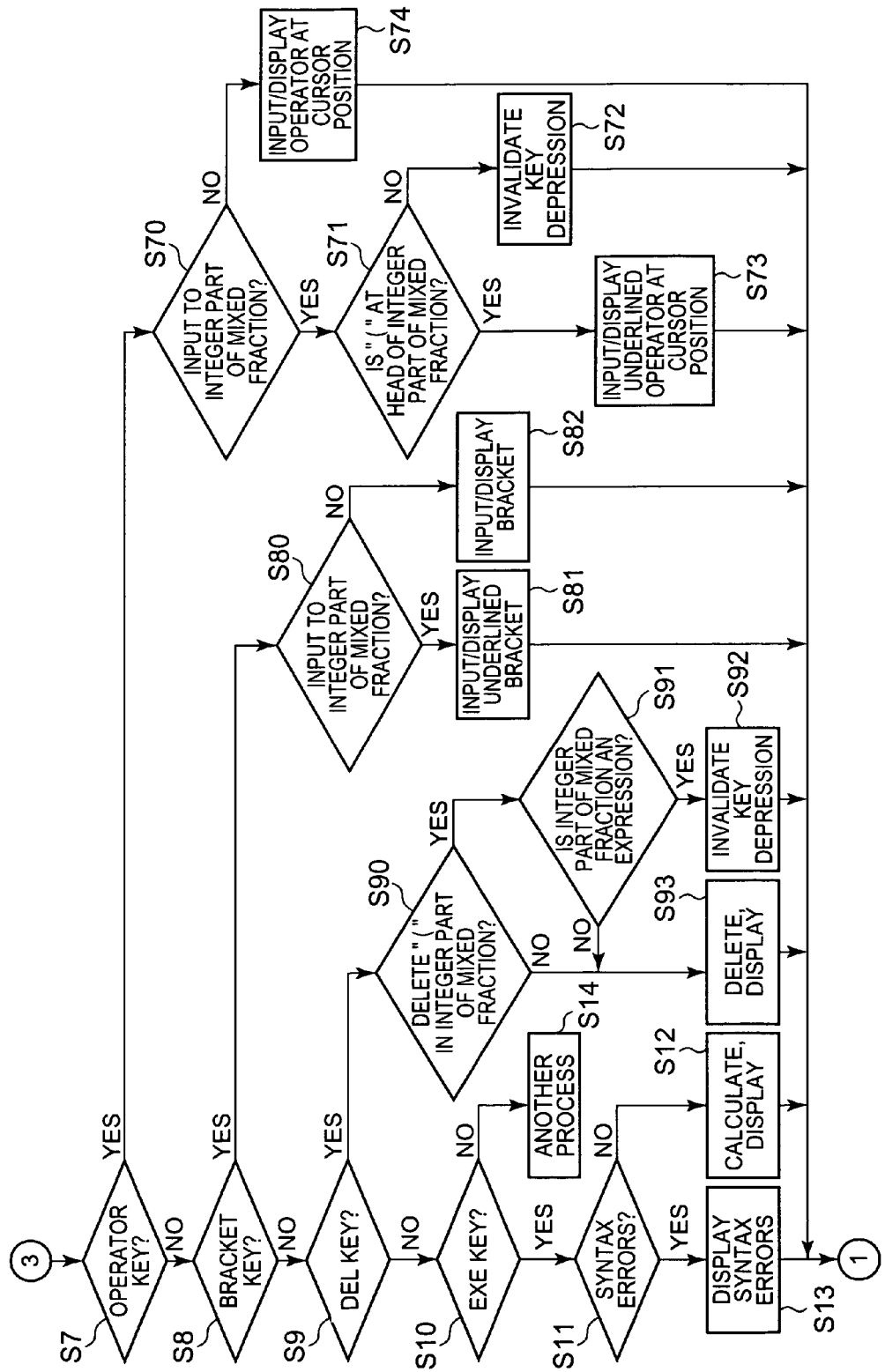
FIG. 5 is a flowchart continued to that of FIG. 4.
Figure 6:
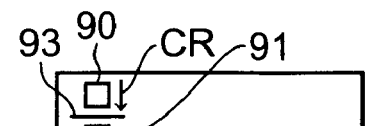
FIG. 6 shows transitional views of a fraction display picture indicating a first example of operation of the calculator.
Figure 6:
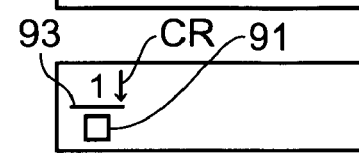
Figure 6:
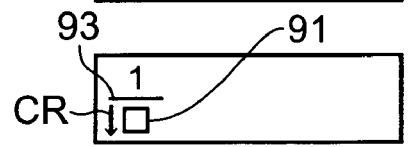
Figure 6:
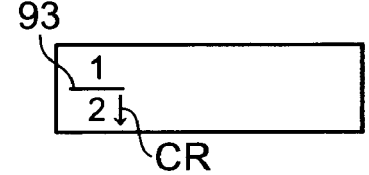
Figure 6:
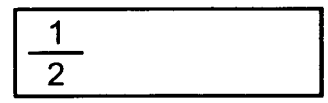
Figure 7:
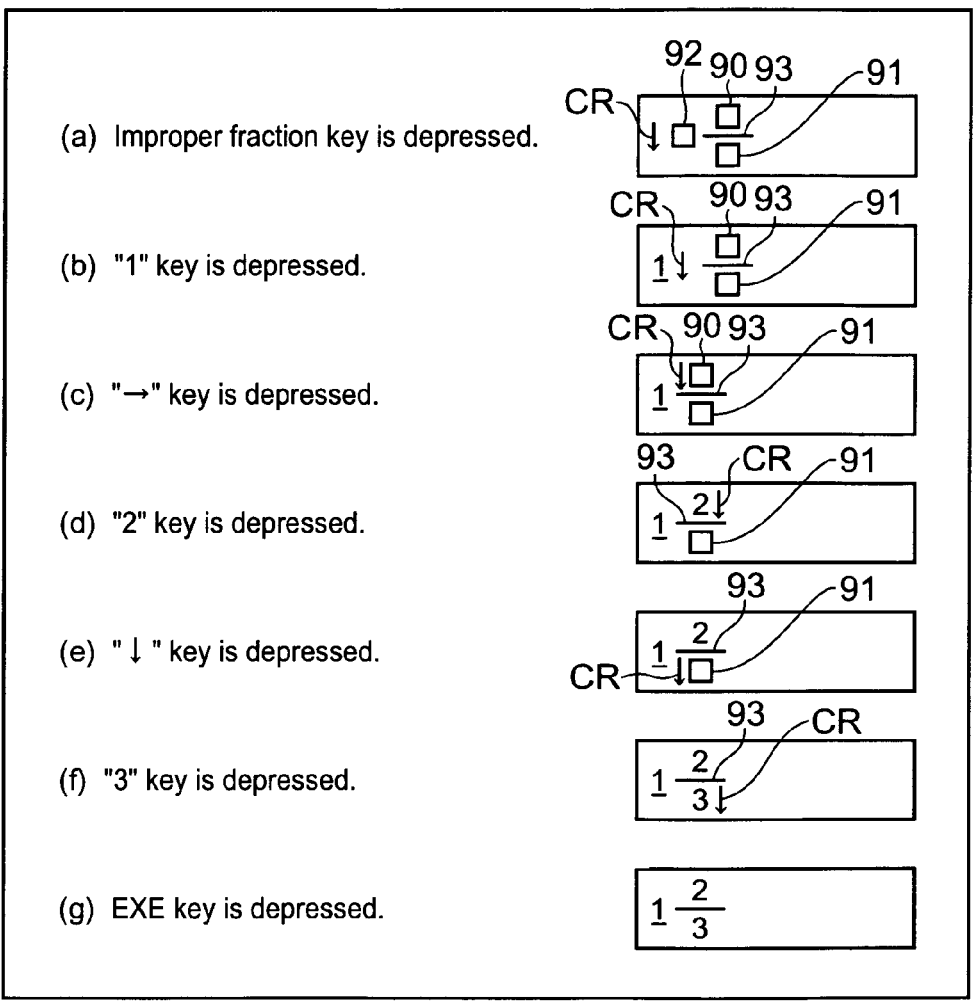
FIG. 7 shows transitional views of a fraction display picture indicating a second example of operation of the calculator.
Figure 8:
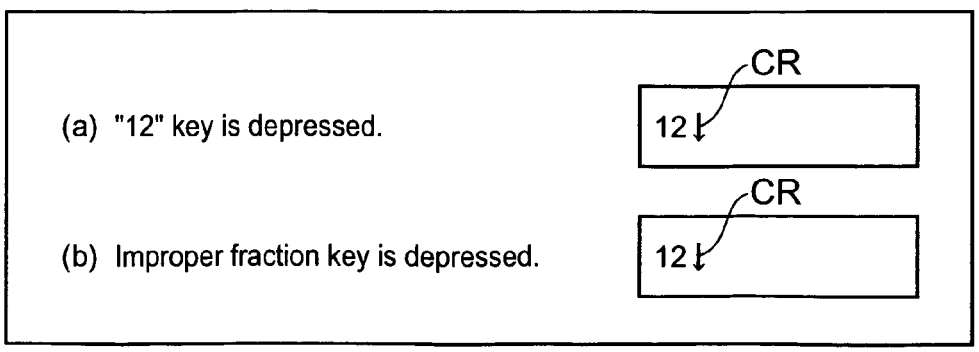
FIG. 8 shows transitional views of a fraction display picture indicating a third example of operation of the calculator.
Figure 9:
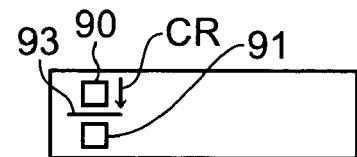
FIG. 9 shows transitional views of a fraction display picture indicating a fourth example of operation of the calculator.
Figure 9:
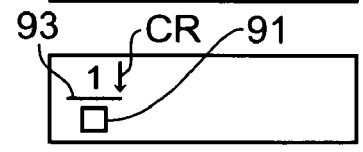
Figure 9:
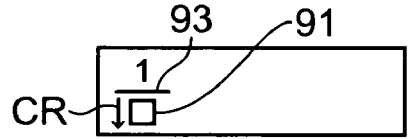
Figure 9:
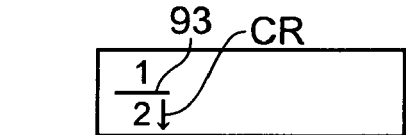
Figure 9:
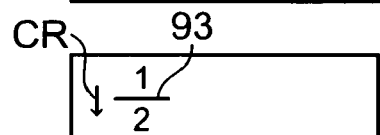
Figure 9:
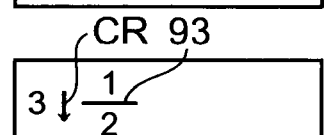
Figure 9:
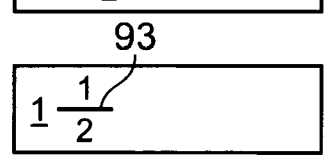
Figure 10:
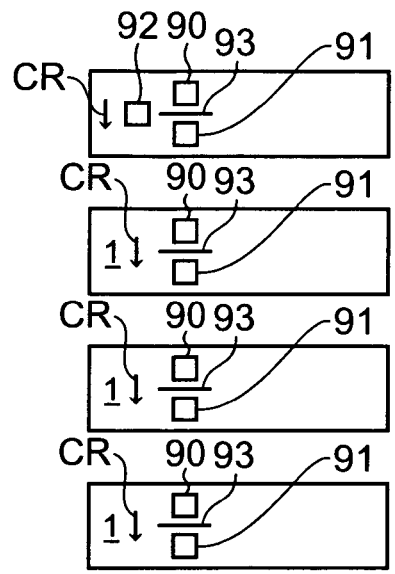
FIG. 10 shows transitional views of a fraction display picture indicating a fifth example of operation of the calculator.
Figure 11:
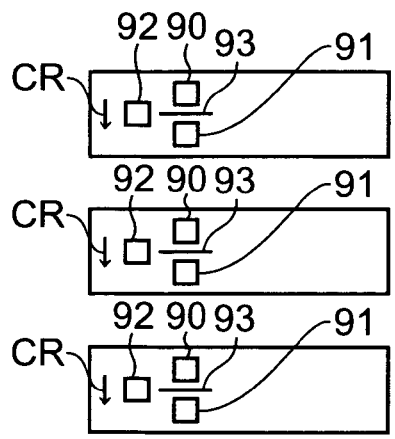
FIG. 11 shows transitional views of a fraction display picture indicating a sixth example of operation of the calculator.

As shown in FIG. 5, if the numerical expression has syntax errors, for example if the numerical expression has no closing bracket corresponding to the open bracket therein, when the user depresses the EXE key 22 (Yes in step S11), the CPU 8 displays an error message on the display 3 (step S13) and then goes to step S1.

Then, if the user depresses the DEL keypad 23 for a numerical expression component, at the position of the cursor CR, other than a bracket in a numerical expression which composes the integer part of a mixed fraction (No in step S90) or if the user depresses the DEL key 23 for an open bracket, at the position of the cursor CR, included in an integer part of a mixed fraction which fails to compose a numerical expression (No in step S91), the CPU 8 deletes the numerical expression component at the position of the cursor CR (No in step S93).

Then, if the user depresses a key of the bracket keypad 25 or a key of the operator keypad 21 when the cursor CR is at a position other than the position of the integer part of the mixed fraction in a state where numerical expression components have been inputted (No in each of steps S80 and S70), the CPU 8 displays a corresponding bracket or operator at the position of the cursor CR (step S82 or S74).

Then, if the user depresses a key (for example the power source key 29) other than that of the direction keypad 24, the improper fraction key 26, the mixed fraction key 27, that of the numeric keypad 20, that of the bracket keypad 25, that of the operator keypad 21, the bracket key 25, the DEL key 23 and the EXE key 22 in a state where numerical expression components have been inputted (Yes in step S1; No in a respective one of steps S2-S10), the CPU 8 performs processing corresponding to the depressed key (step S14).

As described in the fifth and sixth examples of operation, according to the calculator 1, in a state where no numerals or only numerals are inputted to the integer part display area 92, the CPU prohibits an operator from being inputted to the integer part display area 92, thereby prohibiting a numerical expression from being inputted to the integer part of the of the mixed fraction. Thus, unlike the case where an operator is displayed in the integer part, a part of the integer is prevented from being identified by the user as a numerical expression component different from the mixed fraction. Therefore, the integer part of the mixed fraction is easy to identify.

As described in the seventh example of operation, in a state where an open bracket is at the head of the integer part display area 92, the CPU 8 allows the operator to be inputted after the open bracket in the integer part display area 92, thereby clarifying the position of the head of the integer part even when the operator is inputted to the integer part. Thus, a numerical expression is allowed to be inputted to the integer part display area 92, and the user is able to identify the integer part of the mixed fraction easier.

As described in the seventh example of operation, in a state where an open bracket and an operator are in the integer part display area 92, the CPU 8 prohibits the open bracket from being deleted, thereby preventing the position of the head of the integer part from being unclear. Thus, it is ensured that the integer part of the mixed fraction is easy to identify.

As described in the third example of operation, the CPU 8 prohibits the integer part display area 92 from being set and displayed directly after the numerals, thereby preventing the position of the head of the integer part from being unclear, which would otherwise occur. Thus, it is ensured that the integer part of the mixed fraction is easy to identify.

As described in the second, fourth, fifth and seventh examples of operation, the CPU 8 displays underlined numerical expression components such as numerals and operators displayed in the integer part display area 92, thereby enabling the user to identify the integer part easier.

As described in the fourth example of operation, in a state where a numeral is inputted directly before an improper fraction, the CPU 8 multiplies the numeral by the improper fraction. Thus, operation is performed in accordance with the inputted numerical expression even when it is unclear whether the input numerals on the display 3 indicate a mixed fraction or the product of an integer and an improper fraction.

3. Modifications

While in the above-mentioned examples of operation the fraction display apparatus according to the present invention is illustrated as applied to the function calculators, the fraction display apparatus may be applied to mobile phones, personal computers, electronic timepieces, and/or PDAs (Personal Digital Assistants).

While the CPU 8 is illustrated as discriminably displaying the integer part of a mixed fraction with an underline, the integer part of a mixed fraction may be discriminably displayed underlined with a different shaped line such as a wavy line, underdotted, displayed in Gothic, italics, or a color different from the background or put in a frame, brackets or quotation marks.

While when a numerical expression which includes numerals and an operator after an open bracket is displayed in the integer part of a mixed fraction the CPU 8 is illustrated as prohibiting deletion of the open bracket, the numerical expression may not necessarily include only numerals and operators, and may include a numeral, a character and an operand, for example, as shown by "2A" or "2+X".

While the CPU 8 is illustrated as going to step S1 when the operation of the improper fraction key 26, the mixed fraction key 27, the DEL key 23 or a key of the operator keypad 21 is invalidated (steps S40, S50 in FIG. 4; steps S92, S72 in FIG. 5), the CPU 8 may display on the display 3 that the key operation is invalidated, and then go to step S1.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-370609 filed on Dec. 22, 2005 and including specification, claims, drawings and summary. The disclosure of the above Japanese patent application is incorporated herein by reference in its entirety.

What is claimed is:

1. A fraction display apparatus comprising:
    a display unit with a display screen;
    a mixed fraction display setting unit that sets on the display screen an integer part display area, a numerator display area, a vinculum, and a denominator display area for a mixed fraction;
    a numerical expression component input unit by which numerical expression components including at least a numeral, an operator and a bracket are inputted manually to the apparatus;
    a display position control unit that inputs the numerical expression components inputted by the numerical expression component input unit to the corresponding integer part display area, numerator display area and denominator display area for displaying purposes;
    an operator input prohibiting unit that prohibits the display position control unit from inputting the operator inputted by the numerical expression component input unit to the integer part display area when nothing or only numerical values are in the integer part display area; and
    an operator input allowing unit that when an open bracket and a numeral are inputted in this order in the integer part display area, starting with its head, allows the display position control unit to input the operator at a position after the numerical value in the integer part display area.

2. The fraction display apparatus of claim 1, further comprising:
    a deletion unit that is operated manually to delete the numerical expression components displayed on the display screen; and
    an open bracket deletion prohibiting unit that when an open bracket and the operator are inputted in the integer part display area, prohibits deletion of the open bracket.

3. The fraction display apparatus of claim 1, further comprising:
    an integer part identification and display unit that identifies and displays the numerical expression components displayed on the integer part display area in a discriminated manner.

4. The fraction display apparatus of claim 1, further comprising:
    an improper fraction display setting unit that sets a numerator display area, a vinculum and a denominator display area for an improper fraction or a proper fraction on the display screen; and
    a fraction selector by which one of the mixed fraction display setting unit and the improper fraction display setting unit is selected manually, and wherein:
    the display position control unit inputs the numerical expression components inputted by the numerical expression component input unit to the integer part display area, numerator display area and denominator display area on the display screen for displaying purposes when the mixed fraction display setting unit is selected by the fraction selector; and
    the display position control unit inputs the numerical expression components inputted by the numerical expression component input unit to the numerator display area and denominator display area on the display screen for displaying purposes when the improper fraction display setting unit is selected by the fraction selector.

5. The fraction display apparatus of claim 4, further comprising:
    a calculation unit that calculates the value of a numerical expression displayed on the display screen, and wherein:
    when a numeral is inputted directly before the improper traction, the calculation unit multiplies the numeral by the improper fraction.

6. The fraction display apparatus of claim 4, further comprising:
    a fraction setting control unit that prohibits the improper fraction display set unit from setting the numerator display area, vinculum and denominator display area for the improper fraction directly after the numerical value, and prohibits the mixed fraction display setting unit from setting the integer part display area for the mixed fraction directly after the numerical value.

7. A software program product embodied in a computer readable medium, the computer having a display screen, the program causing the computer to perform the functions of:
    setting on the display screen an integer part display area, a numerator display area, a vinculum, and a denominator display area for a mixed fraction;
    receiving numerical expression components including at least a numeral, an operator and a bracket inputted manually;
    displaying the inputted numerical expression components in the corresponding integer part display area, numerator display area and denominator display area on the display screen;
    prohibiting the operator from being inputted to the integer part display area when nothing or only the numeral is in the integer part display area; and
    when an open bracket and a numeral are inputted in this order in the integer part display area, starting with its head, allowing the operator to be inputted at a position after the numeral in the integer part display area.

* * * * *